(12) United States Patent
Haeri

(10) Patent No.: US 10,965,842 B2
(45) Date of Patent: Mar. 30, 2021

(54) ANTI-DAZZLE IMAGING CAMERA AND METHOD

(71) Applicant: Raytheon Company, Waltham, MA (US)

(72) Inventor: Mitchell B. Haeri, Irvine, CA (US)

(73) Assignee: Raytheon Company, Waltham, MA (US)

( * ) Notice: Subject to any disclaimer, the term of this patent is extended or adjusted under 35 U.S.C. 154(b) by 515 days.

(21) Appl. No.: 15/150,781

(22) Filed: May 10, 2016

(65) Prior Publication Data

US 2017/0329202 A1    Nov. 16, 2017

(51) Int. Cl.
*H04N 5/225* (2006.01)
*G02B 1/02* (2006.01)
*G02B 5/32* (2006.01)
*G02F 1/355* (2006.01)
*G02F 1/00* (2006.01)
*G02F 1/35* (2006.01)
*H04N 5/238* (2006.01)

(52) U.S. Cl.
CPC ............ *H04N 5/2251* (2013.01); *G02B 1/02* (2013.01); *G02B 5/32* (2013.01); *G02F 1/3551* (2013.01); *H04N 5/2254* (2013.01); *G02F 1/0063* (2013.01); *G02F 1/3515* (2013.01); *H04N 5/238* (2013.01)

(58) Field of Classification Search
None
See application file for complete search history.

(56) References Cited

U.S. PATENT DOCUMENTS

| | | | | | |
|---|---|---|---|---|---|
| 5,073,705 | A | * | 12/1991 | Sharp | G02F 1/0338 250/216 |
| 5,131,748 | A | * | 7/1992 | Monchalin | G01H 9/00 356/486 |
| 5,396,368 | A | * | 3/1995 | Khoshnevisan | G02B 5/20 359/11 |
| 5,449,904 | A | * | 9/1995 | Miller | G02F 1/0338 250/216 |

(Continued)

FOREIGN PATENT DOCUMENTS

| | | |
|---|---|---|
| JP | H07163613 A | 6/1995 |
| JP | H11352862 A | 12/1999 |
| JP | 2002348195 A | 12/2002 |

OTHER PUBLICATIONS

Design Issues for Tunable Filters for Optical Telecommunications, Laser-Induced Damage in Optical Materials 2001, Gregory J. Exarhos, Arthur H. Guenther, Keith L. Lewis, M. J. Soileau, Christopher J. Stolz, Editors, Proceedings of SPIE vol. 4679 (2002).*
J.P. Huignard & G. Roosen, Photorefractive Materials for Optical Processing, 1986, Springer-Verlag Berlin Heidelberg, Nonliner Optics: Materials and Devices, pp. 128-141.*
Pepper et al., The Photorefractive Effect, Oct. 1990, Scientific American, vol. 263, Issue 4, pp. 62-74.*

(Continued)

*Primary Examiner* — Justin P. Misleh

(57) ABSTRACT

An anti-dazzle imaging camera is provided that includes a photorefractive crystal that is wavelength-agnostic. The photorefractive crystal is configured to receive an optical beam. When the optical beam includes no laser, the photorefractive crystal is configured to pass the optical beam unchanged to an imaging detector. When the optical beam includes a laser, the photorefractive crystal is configured to attenuate the laser to generate a modified optical beam and to pass the modified optical beam to the imaging detector.

20 Claims, 3 Drawing Sheets

(56) References Cited

U.S. PATENT DOCUMENTS

| | | | |
|---|---|---|---|
| 5,495,101 A * | 2/1996 | Sharp | G02F 1/3511 |
| | | | 250/216 |
| 6,785,032 B1 | 8/2004 | Le Mere | |
| 7,692,746 B2 | 4/2010 | Sharp | |
| 8,145,019 B1 * | 3/2012 | Cook | G02B 6/02128 |
| | | | 385/37 |
| 8,986,922 B1 | 3/2015 | Wach | |
| 2003/0090822 A1 | 5/2003 | Richards | |
| 2004/0188617 A1 | 9/2004 | Devitt et al. | |
| 2007/0243125 A1 * | 10/2007 | Evans | C01G 33/00 |
| | | | 423/492 |
| 2009/0086908 A1 | 4/2009 | Harder et al. | |
| 2010/0099789 A1 | 4/2010 | Gu et al. | |
| 2013/0134309 A1 | 5/2013 | Rapaport | |
| 2013/0155485 A1 * | 6/2013 | Pannell | G02F 1/11 |
| | | | 359/285 |
| 2013/0177302 A1 | 7/2013 | Weber | |
| 2013/0273345 A1 | 10/2013 | Chua et al. | |

OTHER PUBLICATIONS

Hallberg, Tomas, et al., "Protection of Mid-Infrared Sensors against Laser Radiation," Preliminary Report, May 2001, pp. 1-34, publisher Sensor Technology, Linkoping, Sweden.

Nakamura, Kiyoshi, et al., "Piezoelectric Properties of $KNbO_3$ Crystals for Extensional Modes," 2001, pp. 717-720, publisher Department of Electrical and Communication Engineering, Graduate School of Engineering, Tohoku University, Sendai, Japan.

Rainbow Photonics, "Photorefractive $KNbO_3$," Jul. 5, 2013, pp. 1-2, publisher Rainbow Photonics AG, Zurich, Switzerland, available at www.rainbowphotonics.com.

II-VI Optical Systems, "Other Crystals," Apr. 3, 2016, pp. 1-3, available at http://opticalsystems.com/materials/crystals/.

Notice of Reason(s) for Rejection in connection with Japanese Patent Application No. 2018-554556 dated Nov. 5, 2019, 6 pages.

International Search Report and Written Opinion of the International Searching Authority in connection with International Patent Application No. PCT/US2017/016017 dated Apr. 10, 2017, 9 pages.

\* cited by examiner

ANTI-DAZZLE IMAGING CAMERA AND METHOD

TECHNICAL FIELD

The present disclosure is directed, in general, to electro-optical counter-countermeasure technology and, more specifically, to an anti-dazzle imaging camera and method.

BACKGROUND OF THE DISCLOSURE

Current warfare tactics include the use of lasers in an attempt to dazzle imaging cameras, thereby interfering with the ability of the cameras to image enemy targets. Laser threats are changing at a rapid pace as these warfare tactics continue to evolve. In order to minimize these threats, anti-dazzle devices have been developed to attenuate the lasers. For example, conventional anti-dazzle devices include filter wheels, liquid crystal devices and acoustic-optic filters. However, these conventional devices have disadvantages that can affect their performance. For example, mechanical filter wheels, which make use of multiple single-frequency thin-film filters, are expensive and slow. They also require a motor, a power source and an external trigger, which increase the weight, volume and expense of the resulting device.

SUMMARY OF THE DISCLOSURE

This disclosure provides an anti-dazzle imaging camera and method.

In one embodiment, an anti-dazzle imaging camera is provided that includes a photorefractive crystal that is wavelength-agnostic. The photorefractive crystal is configured to receive an optical beam. When the optical beam includes no laser, the photorefractive crystal is configured to pass the optical beam unchanged to an imaging detector. When the optical beam includes a laser, the photorefractive crystal is configured to attenuate the laser to generate a modified optical beam and to pass the modified optical beam to the imaging detector.

In another embodiment, an anti-dazzle imaging camera is provided that includes an imaging detector and a photorefractive crystal that is wavelength-agnostic. The imaging detector is configured to generate an image. The photorefractive crystal is configured to receive an optical beam. When the optical beam includes no laser, the photorefractive crystal is configured to pass the optical beam to the imaging detector. When the optical beam includes a laser, the photorefractive crystal is configured to attenuate the laser to generate a modified optical beam and to pass the modified optical beam to the imaging detector. The imaging detector is configured to generate the image based on the optical beam or the modified optical beam received from the photorefractive crystal.

In yet another embodiment, a method for attenuating a laser using an anti-dazzle imaging camera is provided that includes receiving an optical beam. When the optical beam includes no laser, the optical beam is passed to an imaging detector. When the optical beam includes a laser, the laser is passively attenuated with a wavelength-agnostic photorefractive crystal to generate a modified optical beam and the modified optical beam is passed to the imaging detector.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
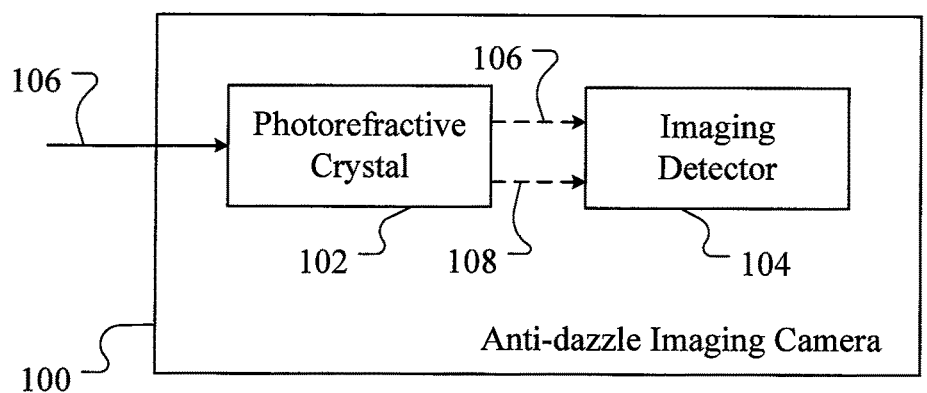
FIG. 1 illustrates an anti-dazzle imaging camera in accordance with the present disclosure.

FIG. 1 illustrates an anti-dazzle imaging camera 100 in accordance with the present disclosure. The embodiment of the anti-dazzle imaging camera 100 shown in FIG. 1 is for illustration only. Other embodiments of the anti-dazzle imaging camera 100 could be used without departing from the scope of this disclosure.

Current warfare tactics include the use of lasers as a countermeasure to dazzle imaging cameras, thereby interfering with their ability to image enemy targets. Laser threats are changing at a rapid pace as these warfare tactics continue to evolve. For example, a tunable laser can be adjusted to operate at different wavelengths in an attempt to defeat anti-dazzle protection. Therefore, the anti-dazzle imaging camera 100 may be implemented as an electro-optical counter-countermeasure (EOCCM) to defeat the threat posed by such lasers.

The anti-dazzle imaging camera 100 may include a visible camera, a shortwave infrared camera, or any other suitable imaging device. The anti-dazzle imaging camera 100 includes a photorefractive crystal 102 and an imaging detector 104. The photorefractive crystal 102 is configured to function as a tunable filter. Thus, as described in more detail below, the photorefractive crystal 102 is configured to attenuate tunable laser threats that may be received at the anti-dazzle imaging camera 100. In addition, when no laser threats are present, the photorefractive crystal 102 is configured to function as a window, allowing light to pass through to the imaging detector 104. The photorefractive crystal 102 may include a potassium niobate crystal or other suitable crystal that may be configured to function as a tunable filter. In addition, the photorefractive crystal 102 may be configured as a ternary crystal.

The imaging detector 104 may include a sensor focal plane array that is configured to generate an image based on light incident on the imaging detector 104 in accordance with any suitable camera technology. As a result, if a laser were aimed at the anti-dazzle imaging camera 100, the imaging detector 104 would generate a distorted image that may provide little to no useful information if not for the presence of the photorefractive crystal 102. Instead, the photorefractive crystal 102 is configured to attenuate such a laser in order to minimize any effects that the laser would otherwise have on the imaging detector 104 and, thus, the resulting image. Accordingly, the imaging detector 104 is capable of generating useful images regardless of whether or not a laser is aimed at the anti-dazzle imaging camera 100 and regardless of the wavelength of the laser.

In operation, an optical beam 106 may be received at the photorefractive crystal 102. When the optical beam 106 does not include radiation from a laser, the photorefractive crystal 102 may pass the optical beam 106 through to the imaging detector 104. The imaging detector 104 may then generate an image based on the image information in the optical beam 106. However, if the optical beam 106 does include radiation from a laser, the photorefractive crystal 102 is configured to passively attenuate that radiation, substantially removing it from the optical beam 106 via reflection, resulting in a modified optical beam 108 being provided to the imaging detector 104. The imaging detector 104 may then generate an image based on the image information in the modified optical beam 108.

In addition, if radiation from a laser is present and then is removed, the photorefractive crystal 102 passively returns to its normal state in which the optical beam 106 is provided unchanged to the imaging detector 104. If radiation from a laser with the same or a different wavelength is subsequently received within the optical beam 106, the photorefractive crystal 102 once again may reflect the laser radiation away from the imaging detector 104 and provide a modified optical beam 108 without any substantial interference from the laser. Thus, in this way, the anti-dazzle imaging camera 100 may generate an image of a surrounding area without interference from a laser distorting the image regardless of the wavelength of the laser, thereby providing the capability of protecting the anti-dazzle imaging camera 100 against tunable laser threats.

Although FIG. 1 illustrates one example of an anti-dazzle imaging camera 100, various changes may be made to the embodiment shown in FIG. 1. For example, the makeup and arrangement of the anti-dazzle imaging camera 100 are for illustration only. Components could be added, omitted, combined, subdivided, or placed in any other suitable configuration according to particular needs.

Figure 2:
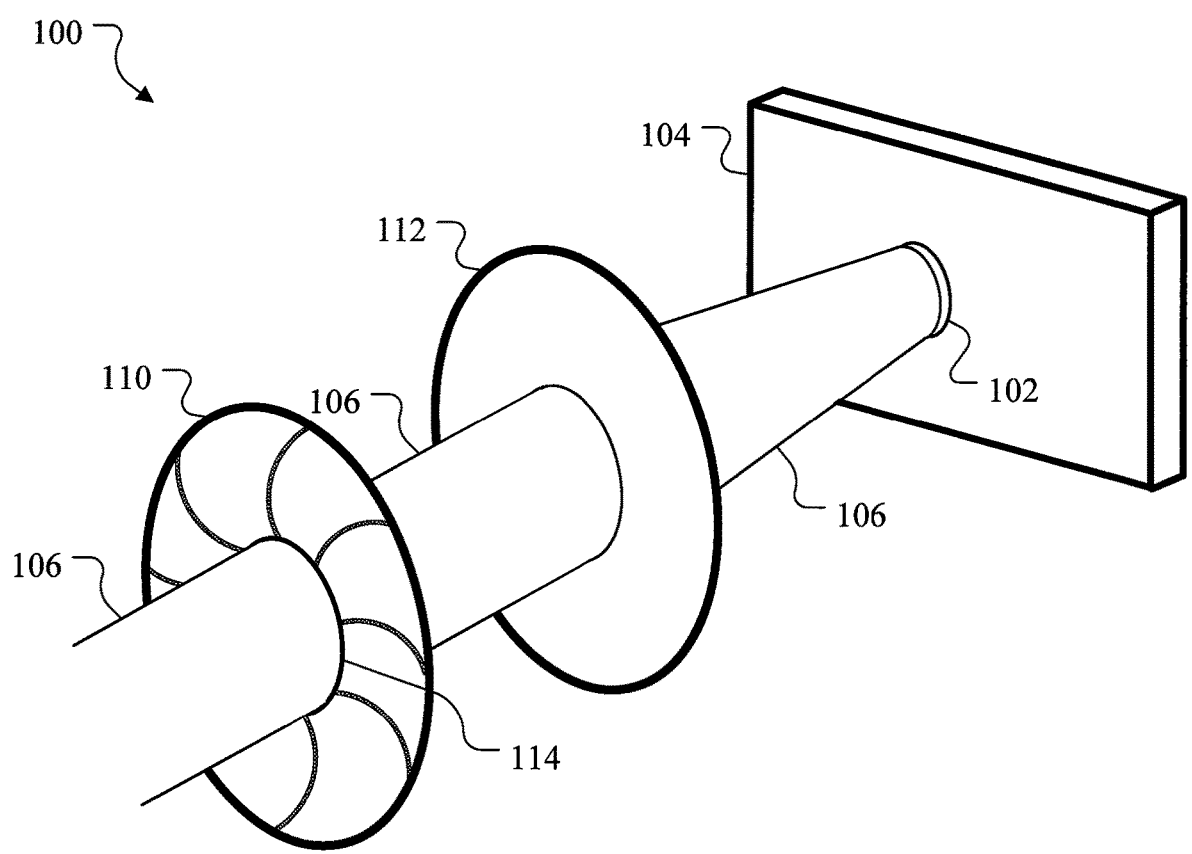
FIG. 2 illustrates the anti-dazzle imaging camera of FIG. 1 in accordance with an embodiment of the present disclosure.

FIG. 2 illustrates the anti-dazzle imaging camera 100 in accordance with an embodiment of the present disclosure. The embodiment of the anti-dazzle imaging camera 100 shown in FIG. 2 is for illustration only. Other embodiments of the anti-dazzle imaging camera 100 could be used without departing from the scope of this disclosure.

For this embodiment, the anti-dazzle imaging camera 100 includes an aperture 110 and a lens assembly 112, in addition to the photorefractive crystal 102 and the imaging detector 104. The aperture 110 is configured to provide an adjustable-size opening 114 to allow varying amounts of light into the anti-dazzle imaging camera 100. The lens assembly 112 may include one or more lenses that are configured to focus light onto the photorefractive crystal 102. Thus, an optical beam 106 may pass through the opening 114, before being focused by the lens assembly 112 onto the photorefractive crystal 102.

The photorefractive crystal 102 is configured to provide at least a portion of the light in the optical beam 106 to the imaging detector 104. The photorefractive crystal 102 may be configured to function as a broadband window in the sensor optical train, and thus to provide substantially all the optical beam 106 to the imaging detector 104, when no laser threats are present. However, if the optical beam 106 includes a laser, the photorefractive crystal 102 is configured to attenuate that laser and provide an optical beam 108 with the laser substantially removed to the imaging detector 104.

The photorefractive crystal 102 is configured to provide a high optical density for continuous wave protection, even with relatively low laser light. For some embodiments, the photorefractive crystal 102 may be configured to attenuate tunable laser threats operating across the visible to near-infrared (NIR) spectral band. In addition, the photorefractive crystal 102 may be configured to function at f-numbers less than f/10. For example, for some embodiments, the photorefractive crystal 102 may be configured to function at f-numbers as low as f/2.8.

The photorefractive crystal 102 may be placed at a region of relatively high optical gain to produce irradiance levels that will passively trigger the photorefractive crystal 102. Thus, for some embodiments as illustrated in FIG. 2, the photorefractive crystal 102 may be located in the converging optical beam 106 directly in front of the imaging detector 104. However, the photorefractive crystal 102 may be located in any suitable location at which sufficient optical gain exists. For example, although illustrated as directly contacting the imaging detector 104, the photorefractive crystal 102 may be located at a relatively slight separation from the imaging detector 104. In addition, for some embodiments, the size of the photorefractive crystal 102 may be matched to the footprint of the optical beam 106 at the point of insertion, as illustrated in FIG. 2.

In this way, an anti-dazzle imaging camera 100 may be implemented that provides an adaptive and tunable EOCCM technology capable of protecting passive and active electro-optical sensors against low-power jamming/dazzle laser threats. In addition, the photorefractive crystal 102 is smaller in size and weight as compared to a filter wheel and, because of its passive nature, requires no motor, external trigger, power source, or electrical bias to function. Thus, the space, weight and power (SWAP) characteristics of the anti-dazzle imaging camera 100 are improved as compared to a camera incorporating a filter wheel. In addition, because the photorefractive crystal 102 requires no additional components, such as additional filters or a motor, the cost of the anti-dazzle imaging camera 100 is reduced as compared to conventional anti-dazzle solutions. As a result, the incorporation of the photorefractive crystal 102 into the anti-dazzle imaging camera 100 greatly increases protection against dazzle for the imaging detector 104, while simultaneously reducing the cost, power and volume requirements of the anti-dazzle imaging camera 100.

Although FIG. 2 illustrates one example of an anti-dazzle imaging camera 100, various changes may be made to the embodiment shown in FIG. 2. For example, the makeup and arrangement of the anti-dazzle imaging camera 100 are for illustration only. Components could be added, omitted, combined, subdivided, or placed in any other suitable configuration according to particular needs.

Figure 3A:
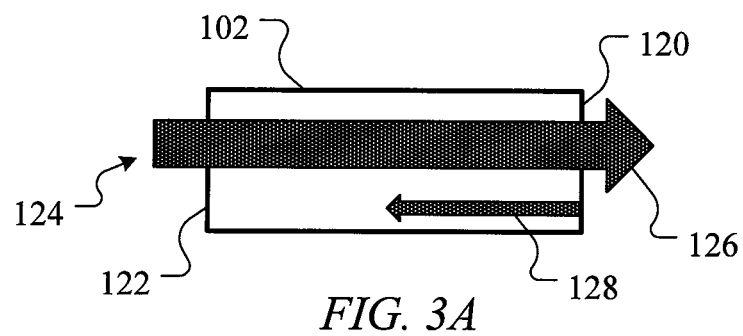
FIGS. 3A-C illustrate the photorefractive crystal of FIG. 1 or 2 attenuating a laser in accordance with the present disclosure.
Figure 3B:
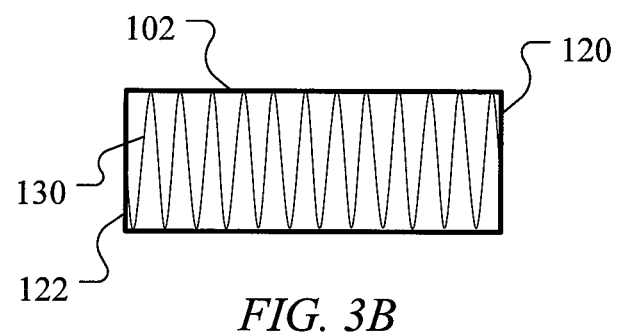
Figure 3C:
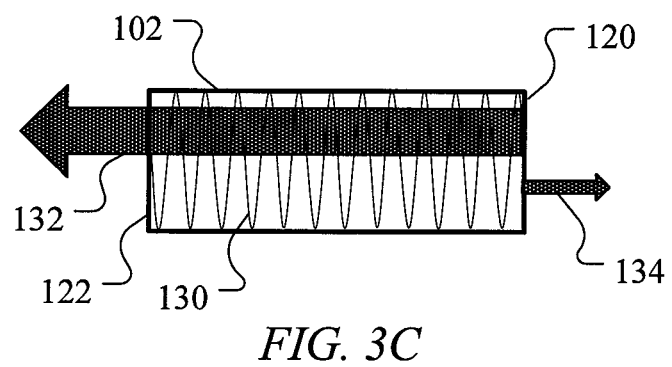

FIGS. 3A-C illustrate the photorefractive crystal 102 attenuating a laser in accordance with the present disclosure. The embodiment of the photorefractive crystal 102 shown in FIG. 3 is for illustration only. Other embodiments of the photorefractive crystal 102 could be used without departing from the scope of this disclosure.

The photorefractive crystal 102 includes a front surface 120 and a back surface 122. For the illustrated embodiment, laser radiation 124 (i.e., radiation from a laser) is received at the photorefractive crystal 102 as a portion of the optical beam 106. The non-laser portion of the optical beam 106 (not shown in FIGS. 3A-C) that includes image information of the surrounding area may pass essentially unchanged through the photorefractive crystal 102.

In operation, as shown in FIG. 3A, when the laser radiation 124 is first received in the optical beam 106, a large portion 126 of the laser radiation 124 may pass through the photorefractive crystal 102 for a relatively short duration, as described below (e.g., in the range of about 50 to about 100 μs). At the same time, the laser radiation 124 experiences Fresnel's reflection off the front surface 120 of the photorefractive crystal 102, which results in a small reflected portion 128 of the laser radiation 124 being reflected back.

Due to this Fresnel's reflection, the laser radiation 124 itself writes a holographic grating 130 inside the photorefractive crystal 102 commensurate with the wavelength of the laser radiation 124, as shown in FIG. 3B. Laser radiation 128 reflected from the front surface 120 of the photorefractive crystal 102 interferes with the incoming laser radiation 124 on the back surface 122 of the photorefractive crystal 102 to generate free carriers. The free carriers that are generated by the interference pattern hotspots write a refractive index grating 130 into the photorefractive crystal 102, i.e., the grating 130 is formed as a systematic variation of the refractive index written into the photorefractive crystal 102. The spacing in the variation is on the order of the wavelength of the laser radiation 124.

This grating 130 may be formed in about 50 to 100 μs, at which point the photorefractive crystal 102 rejects the laser radiation 124. The grating 130 provides a very high rejection and, thus, diffracts a large portion of the harmful radiation 132 in the laser radiation 124 away from the imaging detector 104, with only a small portion 134 of the laser radiation 124 remaining in the modified optical beam 108, as shown in FIG. 3C. This small portion 134 of the laser radiation 124 is minimized to such an extent that the laser radiation 124 is substantially removed from the modified optical beam 108 and provides substantially no interference with the image generated by the imaging detector 104.

This approach is completely passive in that the photorefractive crystal 102 requires no external trigger or power source and the threat laser radiation 124 power writes the grating 130 itself. In addition, once the laser radiation 124 is removed, the grating 130 dissipates and the photorefractive crystal 102 may function again in the same manner if laser radiation 124 having the same or a different wavelength is subsequently received. Thus, the photorefractive crystal 102 is wavelength-agnostic and provides protection against dazzle from tunable laser radiation 124.

Although FIG. 3 illustrates one example of a photorefractive crystal 102, various changes may be made to the embodiment shown in FIG. 3. For example, the makeup and arrangement of the photorefractive crystal 102 are for illustration only. Components could be added, omitted, combined, subdivided, or placed in any other suitable configuration according to particular needs.

Figure 4:
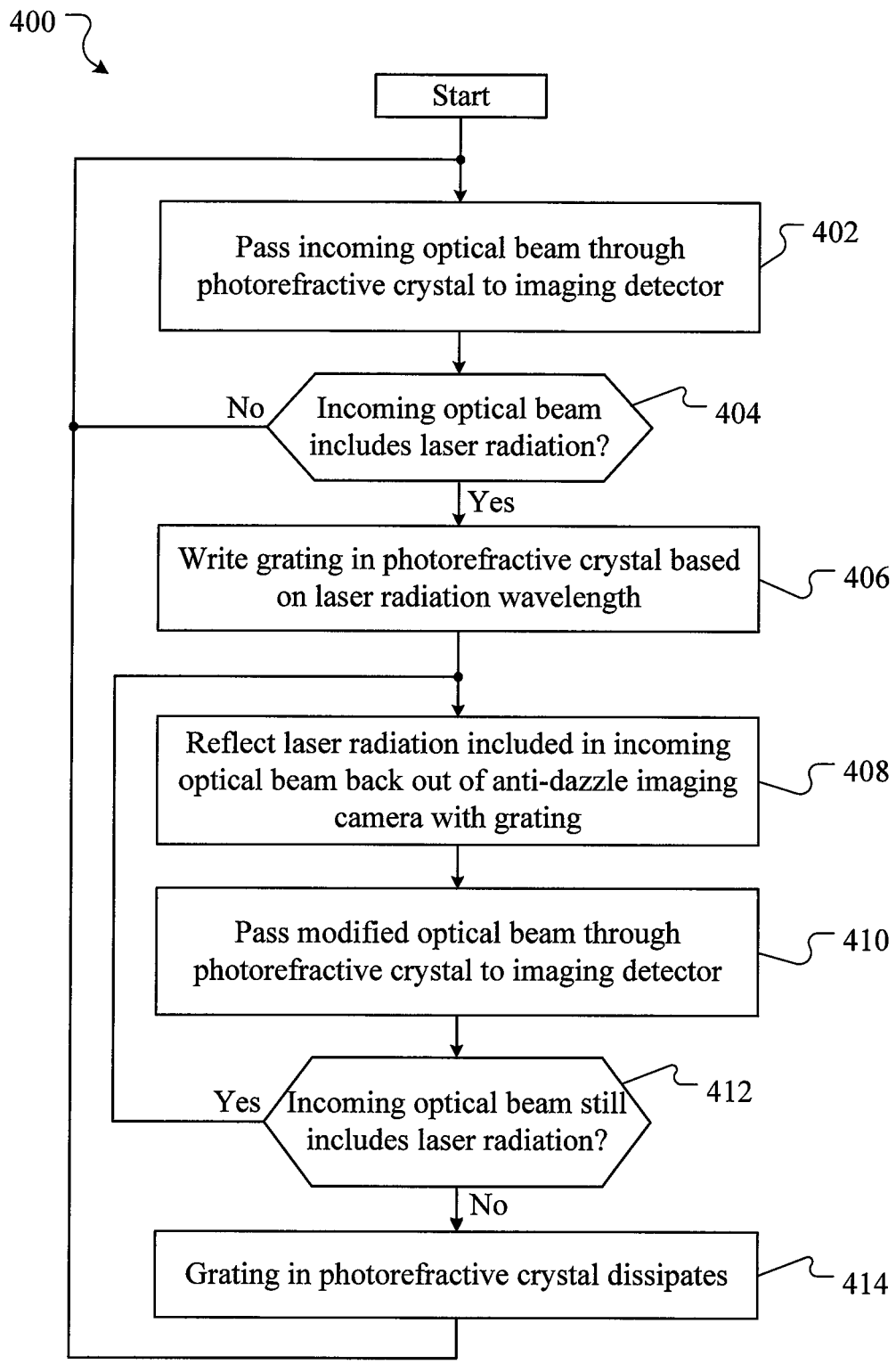
FIG. 4 is a flowchart illustrating a method for attenuating laser radiation using the anti-dazzle imaging camera of FIG. 1 or 2 in accordance with the present disclosure.

FIG. 4 is a flowchart illustrating a method 400 for attenuating laser radiation 124 using the anti-dazzle imaging camera 100 in accordance with the present disclosure. The method 400 shown in FIG. 4 is for illustration only. Laser radiation 124 may be attenuated by the anti-dazzle imaging camera 100 in any other suitable manner without departing from the scope of this disclosure.

Initially, an incoming optical beam 106 is passed through the photorefractive crystal 102 to the imaging detector 104 (step 402). As long as no laser radiation 124 is received in the optical beam 106 (step 404), the photorefractive crystal 102 continues to pass the incoming optical beam 106 to the imaging detector 104 (step 402). However, if laser radiation 124 is received within the optical beam 106 (step 404), Fresnel's reflection of the laser radiation 124 writes a grating 130 in the photorefractive crystal 102 in accordance with the wavelength of the laser radiation 124 (step 406).

A large portion of the laser 132 is reflected back out of the anti-dazzle imaging camera 100 by the grating 130 (step 408). The photorefractive crystal 102 passes a modified optical beam 108, with the laser radiation 124 substantially removed from the optical beam 106, to the imaging detector 104 (step 410). The photorefractive crystal 102 continues to reflect the laser radiation 124 with the grating 130 (step 408) and pass the modified optical beam 108 to the imaging detector 104 (step 410) as long as the laser radiation 124 continues to be received in the optical beam 106 (step 412).

However, once the laser radiation 124 is no longer included in the optical beam 106 (step 412), the grating 130 in the photorefractive crystal 102 dissipates (step 414), and the photorefractive crystal 102 once again passes the unchanged optical beam 106 to the imaging detector 104 (step 402). If laser radiation 124 with the same or a different wavelength is subsequently received (step 404), a new grating 130 will be written in accordance with the wavelength of that laser radiation 124 to allow the photorefractive crystal 102 to generate a modified optical beam 108 substantially removing the new laser radiation 124 from the optical beam 106.

As a result, low-power jamming/dazzle laser threats may be thwarted through the use of an adaptive and tunable EOCCM technology that is capable of protecting passive and active electro-optical sensors from such threats. In addition, this method 400 allows tunable laser threats operating across the visible to NIR spectral band to be addressed through the use of a low-SWAP device (i.e., the anti-dazzle imaging camera 100).

Although FIG. 4 illustrates one example of a method 400 for attenuating laser radiation 124 using the anti-dazzle imaging camera 100, various changes may be made to the embodiment shown in FIG. 4. For example, while shown as a series of steps, various steps in FIG. 4 could overlap, occur in parallel, occur in a different order, or occur multiple times.

Modifications, additions, or omissions may be made to the apparatuses, and methods described herein without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An anti-dazzle imaging camera, comprising:
    an aperture configured to receive an optical beam through an adjustable-sized opening;
    a lens assembly configured to receive the optical beam from the aperture and focus and converge the optical beam; and
    a photorefractive crystal having a first surface and a second surface, the photorefractive crystal configured (i) to receive the converging optical beam from the lens assembly, (ii) when the optical beam includes no laser radiation, to pass the optical beam unchanged to an imaging detector, and (iii) when the optical beam includes laser radiation in a visible to near-infrared (NIR) spectral band, to attenuate the laser radiation to generate a modified optical beam and to pass the modified optical beam to the imaging detector,
    wherein, to attenuate the laser radiation, the photorefractive crystal is configured to (i) reflect, using Fresnel's reflection, a portion of the laser radiation off the first surface of the photorefractive crystal back into the photorefractive crystal and (ii) write a grating in the photorefractive crystal due to interference between the portion of the laser radiation reflected off the first surface and a second portion of the laser radiation entering the second surface of the photorefractive crystal,
    wherein the photorefractive crystal is wavelength-agnostic, and
    wherein a size of the photorefractive crystal is substantially the same as a cross-section size of the converging optical beam at a point where the converging optical beam enters the photorefractive crystal.

2. The anti-dazzle imaging camera of claim 1, wherein the photorefractive crystal comprises a potassium niobate crystal.

3. The anti-dazzle imaging camera of claim 1, wherein the photorefractive crystal comprises a ternary crystal.

4. The anti-dazzle imaging camera of claim 1, wherein the photorefractive crystal is configured, when the optical beam includes laser radiation and subsequently includes no laser radiation, to pass the optical beam unchanged to the imaging detector when the optical beam subsequently includes no laser radiation.

5. The anti-dazzle imaging camera of claim 1, wherein the photorefractive crystal is configured to function at f-numbers less than f/10.

6. The anti-dazzle imaging camera of claim 1, wherein the photorefractive crystal is located in a converging optical beam of the anti-dazzle imaging camera in front of the imaging detector.

7. The anti-dazzle imaging camera of claim 1, wherein the imaging detector comprises a sensor focal plane array.

8. An anti-dazzle imaging camera, comprising:
    an aperture configured to receive an optical beam through an adjustable-sized opening;
    a lens assembly configured to receive the optical beam from the aperture and focus and converge the optical beam;
    an imaging detector configured to generate an image; and
    a photorefractive crystal having a first surface and a second surface, the photorefractive crystal configured (i) to receive the converging optical beam from the lens assembly, (ii) when the optical beam includes no laser radiation, to pass the optical beam to the imaging detector, and (iii) when the optical beam includes laser radiation in a visible to near-infrared (NIR) spectral band, to attenuate the laser radiation to generate a modified optical beam and to pass the modified optical beam to the imaging detector,
    wherein, to attenuate the laser radiation, the photorefractive crystal is configured to (i) reflect, using Fresnel's reflection, a portion of the laser radiation off the first surface of the photorefractive crystal back into the photorefractive crystal and (ii) write a grating in the photorefractive crystal due to interference between the portion of the laser radiation reflected off the first surface and a second portion of the laser radiation entering the second surface of the photorefractive crystal,
    wherein the photorefractive crystal is wavelength-agnostic,
    wherein a size of the photorefractive crystal is substantially the same as a cross-section size of the converging optical beam at a point where the converging optical beam enters the photorefractive crystal, and
    wherein the imaging detector is configured to generate the image based on the optical beam or the modified optical beam received from the photorefractive crystal.

9. The anti-dazzle imaging camera of claim 8, wherein the photorefractive crystal comprises a potassium niobate crystal.

10. The anti-dazzle imaging camera of claim 8, wherein the photorefractive crystal is configured, when the optical beam includes laser radiation and subsequently includes no laser radiation, to pass the optical beam unchanged to the imaging detector when the optical beam subsequently includes no laser radiation.

11. The anti-dazzle imaging camera of claim 8, wherein the photorefractive crystal is configured to function at f-numbers less than f/10.

12. The anti-dazzle imaging camera of claim 8, wherein the photorefractive crystal is located in a converging optical beam of the anti-dazzle imaging camera in front of the imaging detector.

13. The anti-dazzle imaging camera of claim 8, wherein the imaging detector comprises a sensor focal plane array.

14. A method for attenuating a laser using an anti-dazzle imaging camera, comprising:
    receiving an optical beam through an adjustable-sized opening of an aperture;
    receiving the optical beam from the aperture at a lens assembly and focusing and converging the optical beam;
    receiving the converging optical beam from the lens assembly at a wavelength-agnostic photorefractive crystal having a first surface and a second surface, wherein a size of the photorefractive crystal is substantially the same as a cross-section size of the converging optical beam at a point where the converging optical beam enters the photorefractive crystal;
    when the optical beam includes no laser radiation, passing the optical beam to an imaging detector; and when the optical beam includes laser radiation in a visible to near-infrared (NIR) spectral band, passively attenuating the laser radiation with the photorefractive crystal to generate a modified optical beam and passing the modified optical beam to the imaging detector, wherein passively attenuating the laser radiation comprises (i) reflecting, using Fresnel's reflection, a portion of the laser radiation off the first surface of the photorefractive crystal back into the photorefractive crystal and (ii) writing a grating in the photorefractive crystal due to interference between the portion of the laser radiation reflected off the first surface and a second portion of the laser radiation entering the second surface of the photorefractive crystal.

15. The method of claim 14, wherein the photorefractive crystal comprises a potassium niobate crystal.

16. The method of claim 14, wherein the grating in the photorefractive crystal is written according to a wavelength of the laser.

17. The method of claim 16, further comprising, when the optical beam includes laser radiation and subsequently includes no laser radiation, dissipating the grating from the photorefractive crystal.

18. The method of claim 16, wherein the grating comprises a holographic grating.

19. The method of claim 16, wherein the grating comprises a refractive index grating.

20. The method of claim 14, wherein the imaging detector comprises a sensor focal plane array.

* * * * *